United States Patent
Suzuki et al.

(10) Patent No.: US 8,145,487 B2
(45) Date of Patent: Mar. 27, 2012

(54) VOICE RECOGNITION APPARATUS AND NAVIGATION APPARATUS

(75) Inventors: Ryuichi Suzuki, Okazaki (JP); Manabu Otsuka, Nishikamo-gun (JP); Katsushi Asami, Nukata-gun (JP)

(73) Assignee: DENSO CORPORATION, Kariya (JP)

( * ) Notice: Subject to any disclaimer, the term of this patent is extended or adjusted under 35 U.S.C. 154(b) by 1038 days.

(21) Appl. No.: 12/010,338

(22) Filed: Jan. 24, 2008

(65) Prior Publication Data

US 2008/0288254 A1    Nov. 20, 2008

(30) Foreign Application Priority Data

Feb. 16, 2007    (JP) ................... 2007-035868

(51) Int. Cl.
*G10L 15/04* (2006.01)
(52) U.S. Cl. ......... 704/251; 704/246; 704/247; 704/252
(58) Field of Classification Search .................. None
See application file for complete search history.

(56) References Cited

U.S. PATENT DOCUMENTS

| | | | | |
|---|---|---|---|---|
| 5,832,435 A * | 11/1998 | Silverman | ...... | 704/260 |
| 6,078,887 A | 6/2000 | Gamm et al. | | |
| 6,963,637 B2 * | 11/2005 | Broussard et al. | ...... | 379/209.01 |
| 7,366,667 B2 * | 4/2008 | Dobler | ...... | 704/241 |
| 7,454,008 B1 * | 11/2008 | Hayes et al. | ...... | 379/352 |
| 7,664,639 B2 * | 2/2010 | Mochary et al. | ...... | 704/238 |
| 2002/0041588 A1 * | 4/2002 | Gleneck | ...... | 370/352 |
| 2002/0080928 A1 * | 6/2002 | Bates et al. | ...... | 379/88.21 |
| 2004/0006479 A1 | 1/2004 | Tanaka | | |
| 2004/0015354 A1 * | 1/2004 | Miyauchi et al. | ...... | 704/246 |
| 2004/0049388 A1 | 3/2004 | Roth et al. | | |
| 2004/0267528 A9 | 12/2004 | Roth et al. | | |
| 2005/0038652 A1 * | 2/2005 | Dobler | ...... | 704/251 |
| 2005/0038653 A1 | 2/2005 | Roth et al. | | |
| 2005/0038657 A1 | 2/2005 | Roth et al. | | |
| 2005/0043947 A1 | 2/2005 | Roth et al. | | |
| 2005/0043949 A1 | 2/2005 | Roth et al. | | |
| 2005/0043954 A1 | 2/2005 | Roth et al. | | |
| 2005/0049880 A1 | 3/2005 | Roth et al. | | |
| 2005/0064910 A1 * | 3/2005 | Diedrich et al. | ...... | 455/563 |
| 2005/0159948 A1 | 7/2005 | Roth et al. | | |
| 2005/0159950 A1 | 7/2005 | Roth et al. | | |
| 2005/0159957 A1 | 7/2005 | Roth et al. | | |

(Continued)

FOREIGN PATENT DOCUMENTS

JP    A-11-143490    5/1999

(Continued)

OTHER PUBLICATIONS

Office Action dated Feb. 24, 2009 in corresponding Japanese patent application No. 2007-035868 (and English translation).

(Continued)

*Primary Examiner* — Leonard Saint Cyr
(74) *Attorney, Agent, or Firm* — Posz Law Group, PLC

(57) ABSTRACT

A voice recognition apparatus recognizes speaker's voice collected by a microphone, determines whether a telephone number is grouped into categories based on an inclusion of vocabulary in the telephone number that divides the telephone number into groups such as an area code, a city code and a subscriber number, and displays the telephone number in a display part in a grouped form of the area code, city code and subscriber number.

3 Claims, 12 Drawing Sheets

U.S. PATENT DOCUMENTS

| | | | |
|---|---|---|---|
| 2006/0009264 A1* | 1/2006 | Seo et al. | 455/563 |
| 2007/0081661 A1* | 4/2007 | Korah et al. | 379/355.01 |
| 2007/0201631 A1* | 8/2007 | Cave et al. | 379/88.01 |
| 2007/0286398 A1* | 12/2007 | Ramamoorthy et al. | 379/355.02 |
| 2008/0126091 A1* | 5/2008 | Clark et al. | 704/246 |

FOREIGN PATENT DOCUMENTS

| | | |
|---|---|---|
| JP | A-11-305793 | 11/1999 |
| JP | 2000-187497 A | 7/2000 |
| JP | A-2000-293195 | 10/2000 |
| JP | A-2001-92493 | 4/2001 |
| JP | 2001-154691 A | 6/2001 |
| JP | A-2004-69719 | 3/2004 |
| JP | A-2004-93698 | 3/2004 |
| JP | A-2004-333703 | 11/2004 |
| JP | A-2005-275228 | 10/2005 |
| JP | A-2006-039954 | 2/2006 |
| JP | A-2006-58390 | 3/2006 |
| JP | 2007-25075 A | 2/2007 |

OTHER PUBLICATIONS

Notification of Reason(s) for Rejection issued from the Japanese Patent Office on Aug. 17, 2010 in the corresponding Japanese patent application No. 200735868 [Appeal Request No. 2009-17477] (with English translation).

* cited by examiner

VOICE RECOGNITION APPARATUS AND NAVIGATION APPARATUS

CROSS REFERENCE TO RELATED APPLICATION

This application is based on and claims the benefit of priority of Japanese Patent Application No. 2007-35868 filed on Feb. 16, 2007, the disclosure of which is incorporated herein by reference.

FIELD OF THE DISCLOSURE

The present disclosure generally relates to a voice recognition apparatus for use in a vehicle.

BACKGROUND INFORMATION

Conventionally, various devices that recognize a digit train included in a user's voice by voice recognition have been proposed (e.g., see Patent Documents 1 to 3).
[Patent Document 1] JP-A-H11-305793
[Patent Document 2] JP-A-H10-254489 (U.S. Pat. No. 6,078,887)
[Patent Document 3] JP-A-2006-58390

A phone number is displayed as one train of consecutive digits or in the form of groups of area code, city code, and subscriber number separated by parentheses or "-" (hyphen). For example, when a phone number is displayed after being separated by groups of area code, city code, and subscriber number, the groups are often separated by utterance of "hyphen" or "of."

However, devices described in Patent Documents 1 to 3, when a phone number is uttered in a thus separated form, cannot recognize the phone number as the manner uttered by a user, and thus cannot display the phone number after separating it into groups of area code, city code, and subscriber number according to an uttered separating method. As a result, a phone number different from the one that is uttered by the user is displayed, possibly giving the user a sense of incongruity.

Some vehicle navigation apparatuses have a phone number search function to search for a destination facility by inputting its phone number in voice. The phone number search function, when a phone number is inputted in voice, consults a database created using phone numbers and the like enrolled in a telephone directory and displays the phone number of the destination facility according to a separating method used in the database.

With such apparatuses, for example, when a method of separating an area code, a city code, and a subscriber number is changed due to the unification and/or reorganization of telephone switching offices, a phone number enrolled in the database is displayed by a pre-change separating method in spite of user's utterance of the phone number in accordance with a new separating method, possibly giving the user a sense of incongruity.

SUMMARY OF THE DISCLOSURE

The present invention has been made in view of the above-described and other points, and its object is to enable the displaying of a phone number after separating it into groups according to a manner of utterance of the phone number by a user.

A feature of this invention includes: a voice recognition means that recognizes voice collected by a microphone; a grouping determination means that determines whether to group a phone number included in voice recognized by the voice recognition means into an area code, a city code, and a subscriber number based on a content of the recognized voice; and a display control means that, when the grouping determination means determines that the phone number is to be grouped, displays in a display part the phone number after grouping it into an area code, a city code, and a subscriber number.

In this construction, when it is determined from the content of a phone number included in a recognized voice that the phone number is to be grouped into an area code, a city code, and a subscriber number, the phone number is displayed in the display part after being grouped into an area code, a city code, and a subscriber number, thereby enabling the phone number being displayed in a grouped form according to the content of user's utterance.

Further, when a navigation apparatus for performing navigation processing includes the voice recognition apparatus of claim 1, the voice recognition apparatus feeds the navigation processing with a telephone number uttered by a speaker based on speech recognition performed by the voice recognition apparatus that recognizes an intention of the speaker in a speaker's manner of telling the telephone number.

Thus, the navigation apparatus is enabled to utilize the telephone number in an intended manner of the speaker.

BRIEF DESCRIPTION OF THE DRAWINGS

Other objects, features and advantages of the present invention will become more apparent from the following detailed description made with reference to the accompanying drawings, in which.

DETAILED DESCRIPTION

Embodiments of the present invention are described with reference to the accompanying drawings. In the following embodiments, the number of digits of an area code, a city code and a subscriber number of the phone number is respectively assumed to be 3 digits, 3 digits, and 4 digits. However, the number of digits of the grouped number such as the area code and city code may change depending on the countries, and present invention can be adapted for handling different number of digits in different countries.

Figure 1:
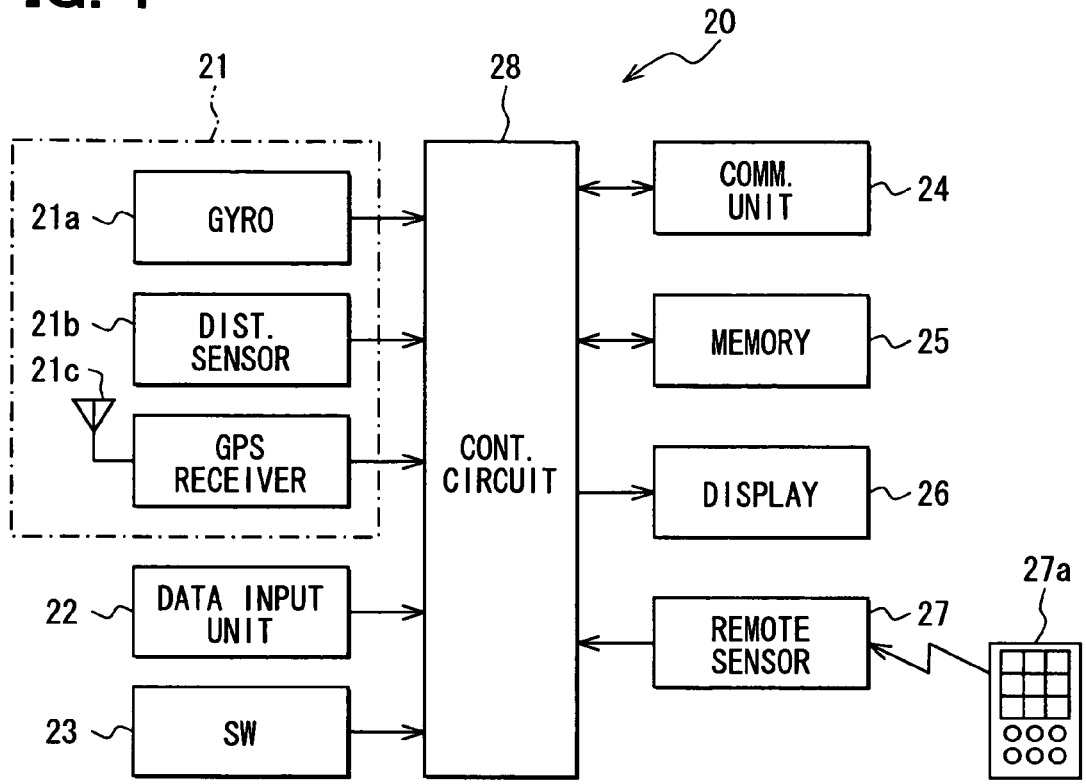
FIG. 1 shows a block diagram of a voice recognition system installed in a navigation system in an embodiment of the present invention.

FIG. 1 shows the construction of a voice recognition apparatus 10 of one embodiment of the present invention mounted in a navigation apparatus 20. The navigation apparatus 20 includes a position detector 21, a data input unit 22, an operation switch group 23, a communication unit 24, an external memory 25, a display unit 26, a remote control sensor 27, and a control circuit 28.

The position detector 21, which includes a well-known gyroscope 21a, a distance sensor 21b, and a GPS receiver 21c, outputs information for determining a current position and a direction based on the respective properties of these sensors to the control circuit 28.

The data input unit 22 inputs various data from a storage medium in which various data such as map data are stored.

The operation switch group 23 includes pushbutton switches provided on the periphery of the display screen of the display unit 26 and touch switches provided in the display part of the display unit 26, outputs signals to the control circuit 28 according to user's switch operations. The touch switches, which are disposed in the front of the display part of the display unit 26, detect a touch operation and touch position on their touch surface.

The communication unit 24 is a device for performing radio communication with the outside via a radio communication network.

The external memory 25 is a memory provided aside from RAM and ROM provided in a control circuit 28 described later, and is constructed by using a nonvolatile storage medium such as a flash memory.

The display unit 26 includes a display part such as liquid crystal, and displays a video corresponding to a video signal inputted from the control circuit 28 in the display part.

The remote control sensor 27 outputs a signal received from a remote control unit 27a that transmits radio signals by infrared rays and the like based on user's operation, to the control circuit 28.

The control circuit 28 is constructed including a CPU, a RAM, a ROM, an I/O, and the like, and the CPU performs various processes according to a program stored in the ROM.

The control circuit 28 determines a current position based on based on information inputted from the position detector 21 (e.g., a current position determination process), overlap-displays an own vehicle position mark on a map in the vicinity of a current position (e.g., a map display process), and acquires traffic information via the communication unit 24 according to a display operation of traffic information to display traffic information in the vicinity of a current position (e.g., a traffic information display process). The control circuit 28 may perform other processes on demand basis, and/or upon having a request from another controller or the like.

Figure 2:
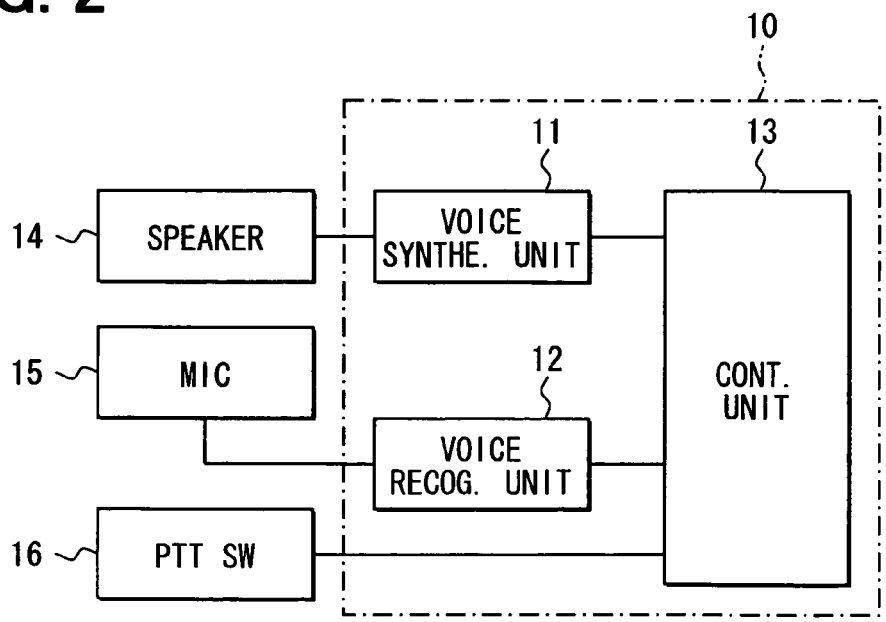
FIG. 2 shows a block diagram of a voice recognition unit in the embodiment of the present invention.

The control circuit 28 in the present embodiment includes a voice recognition unit shown in FIG. 2. The voice recognition unit includes: a voice synthesizing unit 11 that synthesizes voice to be outputted from a loudspeaker 14; a voice recognition unit 12 that digitalizes voice collected by a microphone 15 to analyze a voice signal for voice recognition; and a control unit 13 constructed as a computer including a CPU, a memory, and the like. The CPU of the control unit 13 performs various processes according to a program stored in the memory.

A signal indicating the beginning of utterance from a PTT (Push to Talk) switch 16 is inputted to the control unit 13 according to user's operations.

Figure 3:
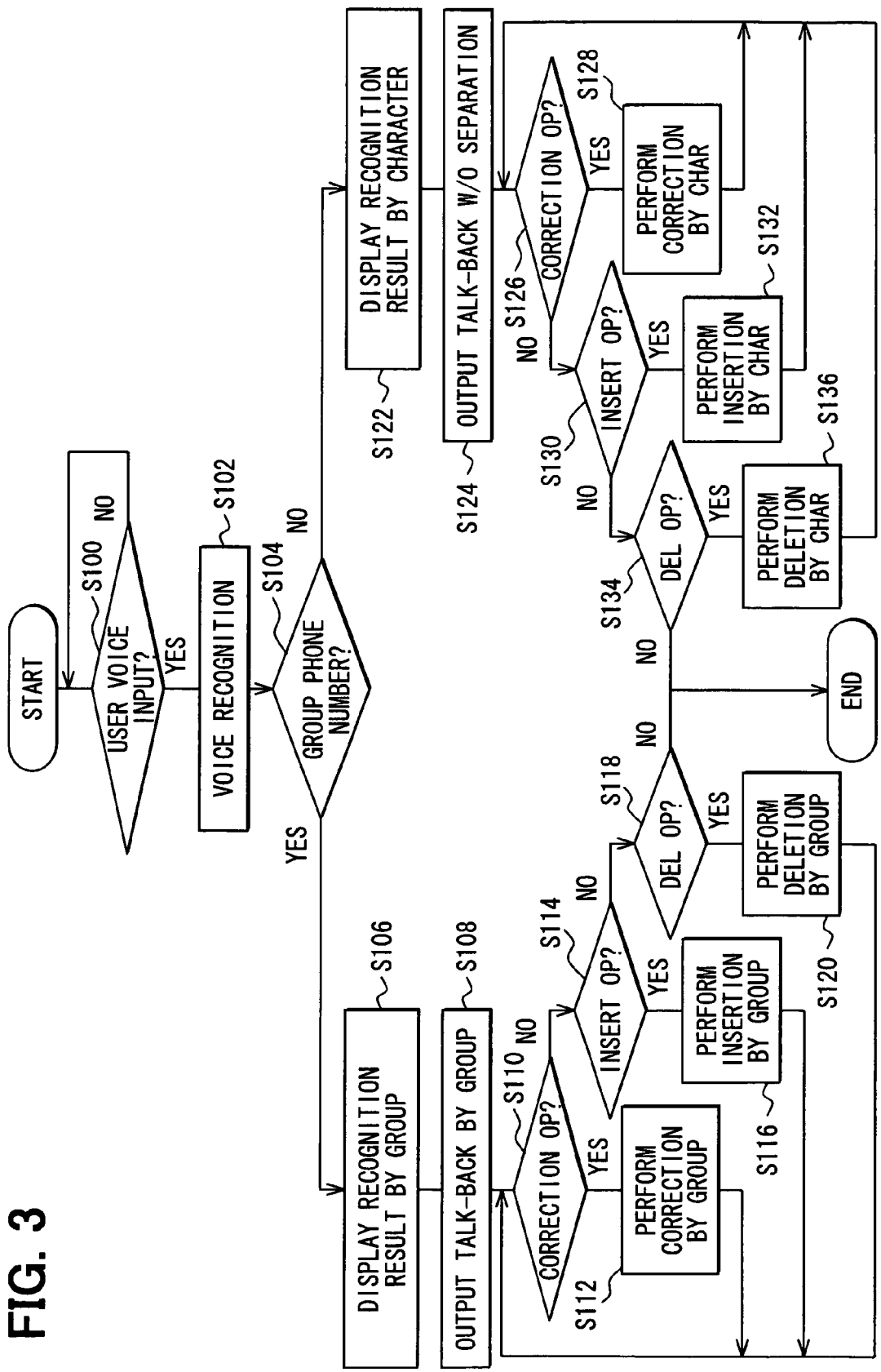
FIG. 3 shows a flowchart of a telephone number recognition process by a control circuit and a control unit.
Figure 4:
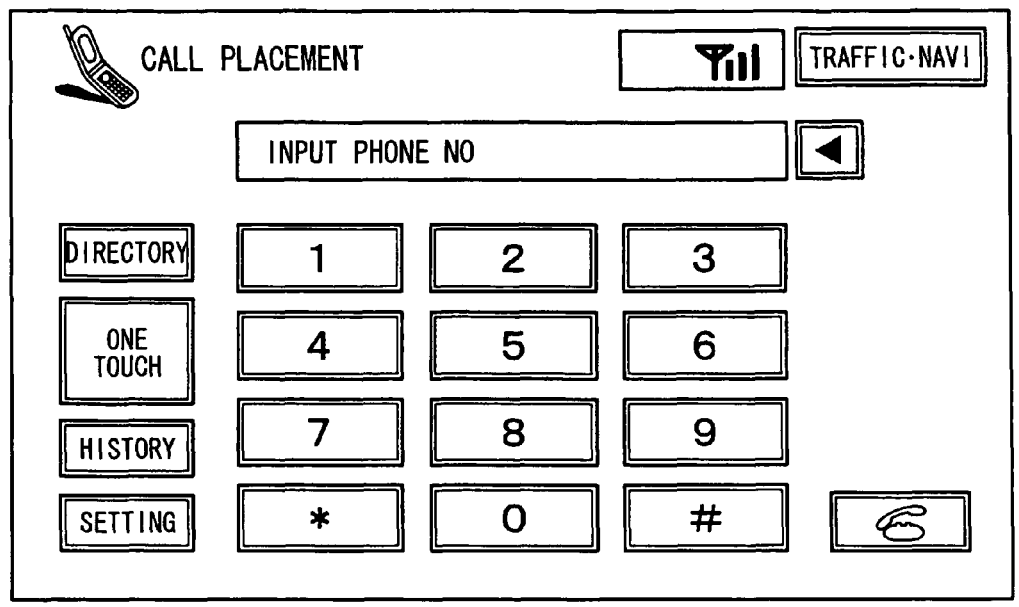
FIG. 4 shows an illustration of a telephone number input screen in an input wait state.

In conjunction with the control circuit 28 and the control unit 13, the navigation system 20 recognizes a phone number included in voice collected by the microphone 15 and displays it in the display part of the display unit 26, and outputs a talk-back voice of the displayed phone number from the loudspeaker 14. FIG. 3 shows a flowchart of a phone number recognition process by the control circuit 28 and the control unit 13. When the ignition switch is turned on, the navigation apparatus 20 is activated. The control circuit 28 and the control unit 13, when a signal indicating the start of utterance is inputted from the PTT switch 16 according to user's operation, a phone number input screen in an input wait state shown in FIG. 4 is displayed in the display part of the display unit 26, and the phone number recognition process shown in FIG. 3 is performed.

The process determines whether user's utterance is inputted via the microphone 15 (S100). When user's utterance is not inputted, the process repeats determination of S100.

When user's utterance is inputted, YES is determined in S100, followed by voice recognition process (S102). Specifically, the process commands the voice recognition unit 12 to recognize voice collected by the microphone 15.

The process determines whether to group the content of a phone number included in voice recognized by the voice recognition unit 12 into an area code, a city code, and a subscriber number (S104).

In the present embodiment, the process determines whether to group a phone number into an area code, a city code, and a subscriber number according to conditions (1) to (4) below.

(1) When a phone number included in a recognized voice includes vocabularies for grouping the phone number into an area code, a city code, and a subscriber number, the process determines that the phone number should be grouped into an area code, a city code, and a subscriber number. When a phone number included in a recognized voice does not include vocabularies for grouping the phone number into an area code, a city code, and a subscriber number, the process determines that the phone number is not grouped. Vocabularies for grouping the phone number into an area code, a city code, and a subscriber number include a "hyphen," "of," "bracket," "space," and the like.

For example, when "6789 of 345 of 012" is uttered, since "of" is included, grouping is performed. When "012 hyphen 345 hyphen 6789" is uttered, since "hyphen" is included, grouping is performed. In these cases, "0123456789" is separated in positions of "of" and "hyphen", such as "012," "345," and "6789." On the other hand, when "0123456789" is uttered, grouping is not performed.

(2) When digit-unit-reading vocabularies are included in a phone number included in a recognized voice, the phone number is grouped into an area code, a city code, and a subscriber number. When digit-unit-reading vocabularies are included in a phone number included in a recognized voice, the phone number is not grouped. Digit-unit-reading vocabularies include "three hundred forty five," "sixty seven hundred eighty nine," and the like.

For example, when "0123, forty five, 6789" is uttered, since the digit-unit-reading vocabulary "forty five" is included, grouping is performed. In this case, the "0123456789" is separated in the position of the digit-unit-reading vocabulary, such as "0123," "45," and "6789."

(3) When silent states for separating a phone number into plural groups are included in the phone number included in a recognized voice, the phone number is grouped into an area code, a city code, and a subscriber number. When silent states for separating a phone number included in a recognized voice into plural groups are not included, the phone number is not grouped. A silent state refers to a state in which a state free of voice input lasts for not shorter than a predetermined period of time (e.g., 0.5 seconds).

For example, when "012" is uttered, then "345" is uttered after a silent state lasts for one second, and then "6789" is uttered after a silent state lasts for one second, since two silent states lasting for not shorter than a predetermined period of time are included in a phone number, grouping is performed. In this case, the "0123456789" is separated in the positions of silent states, such as "012," "345," and "6789."

(4) When long sounds for separating a phone number into plural groups are included in the phone number included in a recognized voice, the phone number is grouped into an area code, a city code, and a subscriber number. When long sounds for separating a phone number included in a recognized voice into plural groups are not included, the phone number is not grouped. A long sound refers to a sound sustained for not shorter than a predetermined period of time (e.g., 0.5 seconds). Technology for determining whether long sounds are included in a phone number included in a recognized voice is already known.

For example, when "2" of "0123456789" is sustained for one second or more, and "5" is sustained for one second or more, since two long sounds are included, grouping is performed. In this case, "0123456789" is separated in the positions of the long sounds, such as "012," "345," and "6789."

When grouping is determined in at least one of the above-described conditions (1) to (4), grouping is performed. When the grouping is determined, the process proceeds to S106, and otherwise proceeds to S122.

Figure 5:
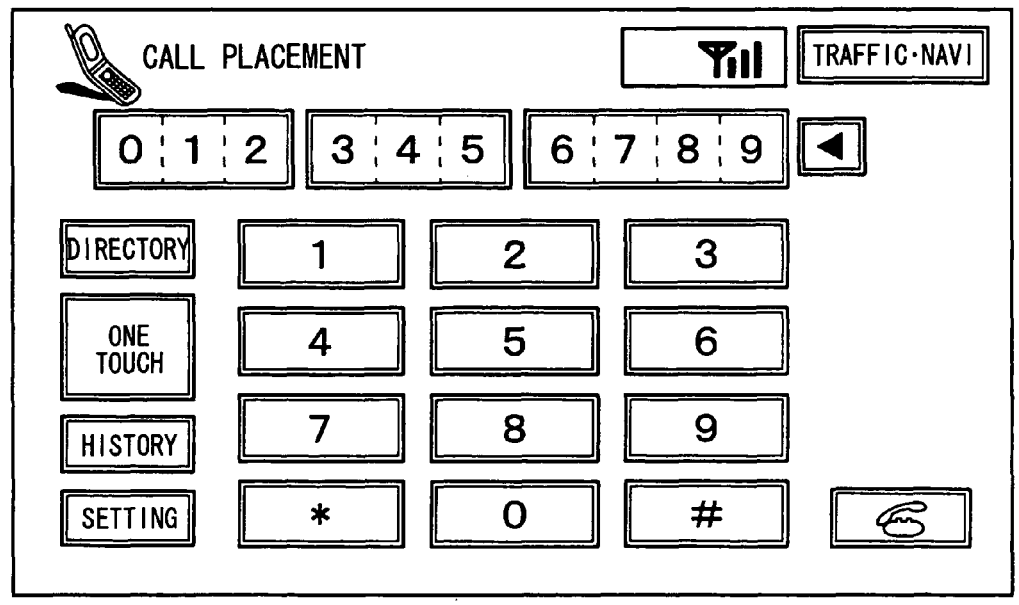
FIG. 5 shows an illustration of a telephone number input screen showing a telephone number in a grouped state.

Here, it is assumed that grouping is determined in S104. In S106, a recognition result is displayed on a group basis. Specifically, the process displays a phone number input screen on which the phone number is grouped into an area code, a city code, and a subscriber number, in the display part of the display unit 26. FIG. 5 shows a display example when "6789 of 345 of 012" is uttered. According to user's utterance contents, each of groups "012," "345," and "6789" is framed.

The process outputs a talk-back voice of the phone number displayed by group in the display part of the display unit 26 in a displayed separation form from the loudspeaker 14 (S108). Specifically, the process outputs a voice signal for outputting a talk-back voice of the phone number on a group basis to the voice synthesizing unit 11, and outputs the talk-back voice to the voice synthesizing unit 11 from the loudspeaker 14.

Figure 6:
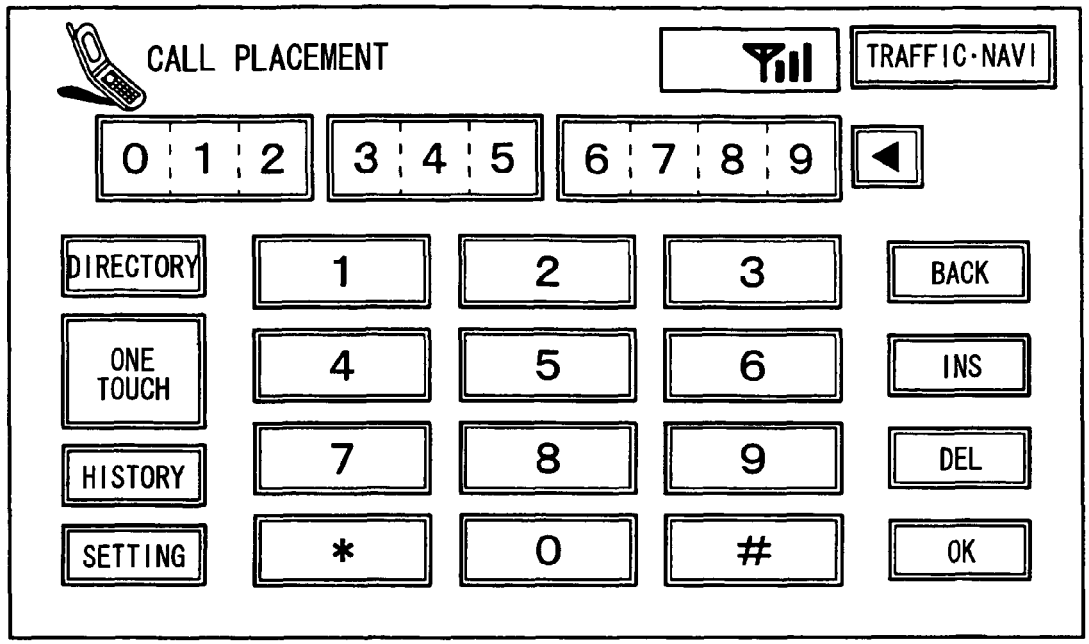
FIG. 6 shows an illustration of a telephone number input screen for an inquiry of a choice of a correction operation, an insertion operation, a deletion operation or an input confirmation operation.

In S110, the process inquires of the user whether to correct a part of the phone number displayed in the display part. In S114, the process inquires of the user whether to insert a number in any position of the phone number displayed in the display part. In S118, the process inquires of the user whether to delete a part of the phone number displayed in the display part. Specifically, as shown in FIG. 6, the process displays an inquiry screen for inquiring of the user whether to perform any one of correction operation, insertion operation, and deletion operation, or terminate (determine) the input in the display screen of the display unit 26, and performs correction operation, insertion operation, or deletion operation, depending on whether the user commands any one of correction operation, insertion operation, or deletion operation by operating the touch switches of the operation switch group 23, or terminates (determines) the input.

Figure 7:
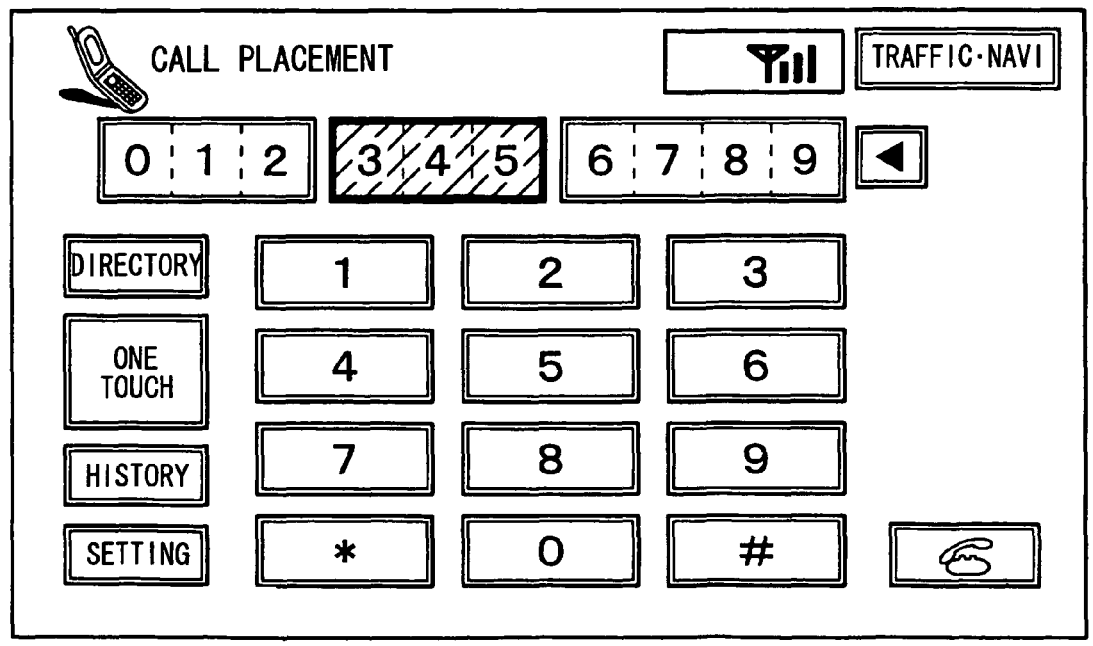
FIG. 7 shows an illustration of a telephone number input screen for a correction operation of a unit of grouped telephone number.

When the user commands correction operation, determination in S110 becomes YES, and the process performs correction operation on a group basis (S112). In the correction operation on a group basis, according to a touch operation on the touch switches, the group of the phone number displayed in a position in which the touch operation is performed is determined as a correction position. For example, as shown in FIG. 7, when a group "345" of "012-345-6789" is touch-operated, the group "345" is determined as a correction position, and is changed in color.

A guidance "Correct the second group '345.' Utter a desired number to be corrected. Pi (i.e., A short beep sound that indicates termination of the guidance)" is outputted in a voice from the loudspeaker 14.

Figure 8:
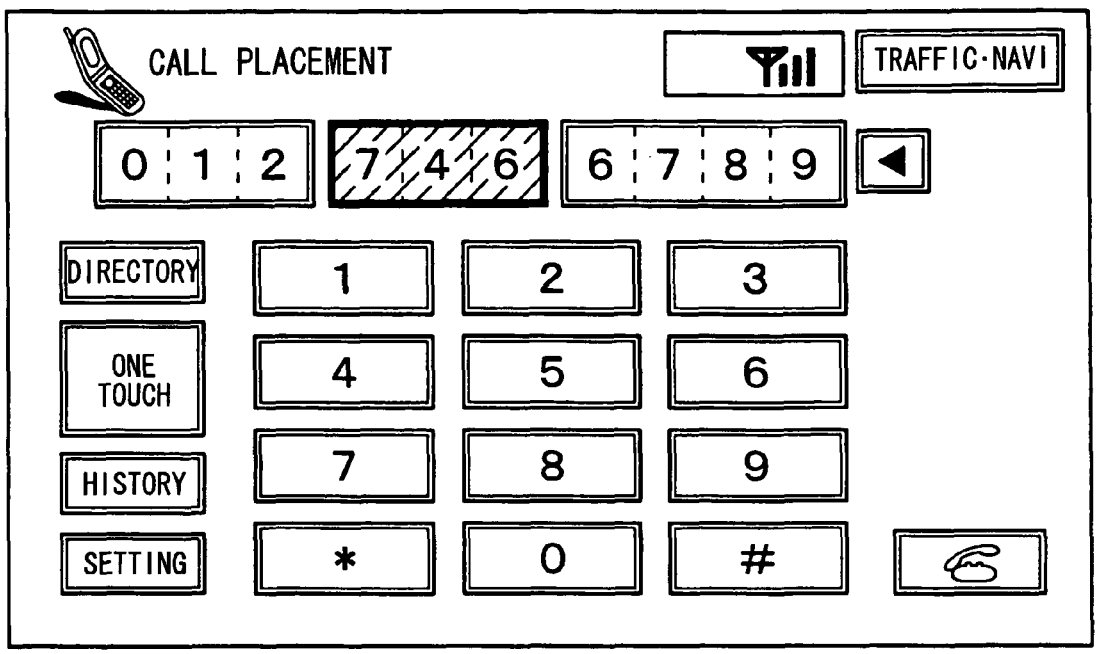
FIG. 8 shows another illustration of a telephone number input screen for the correction operation of a unit of grouped telephone number.

After the process thus prompts the user to utter a new number in the correction position, a number in the correction position is corrected to the new number upon utterance of a new number by the user. For example, when a voice indicating "746" is inputted by the user, as shown in FIG. 8, the original number is corrected to "012-746-6789," and a guidance "The second group '345' has been corrected to '746'." is outputted in a voice from the loudspeaker 14.

After a correction position is determined, when a vocabulary indicating change of the correction position such as "left," "right," "next," and "return" is recognized before an output of a guidance prompting the user to utter a desired correction number in a voice from the loudspeaker 14, the correction position is changed according to the recognized vocabulary. For example, when "left" or "return" is recognized in a state in which the city code "345" is specified as a correction position, the area code "012" is changed to a correction position. Further, when "right" or "next" is recognized in a state in which the city code "345" is specified as a correction position, the subscriber number "6789" is changed to a correction position, and a correction operation is performed in the changed correction position. When the correction operation in S112 thus terminates, the process returns to S110.

According to the inquiry screen shown in FIG. 6 for inquiring of the user whether to perform any one of the correction operation, the insertion operation, and the deletion operation, when the insertion operation is specified by a user operation, determination in S114 becomes YES, and the process performs an insertion operation on a group basis (S116). In the insertion operation on a group basis, according to a touch operation of the touch switch, a group of the phone number displayed in a touch-operated position is determined as an insertion position.

After prompting the user to utter a new number in the insertion position, when the number has been inputted in a voice by the user, the number is inserted in the insertion position. For example, when the group "356" of "012-356-7890" is touch-operated, the "356" is determined as a group to be inserted. Furthermore, when a touch operation on two adjacent digits is detected by the touch switch, a portion between the two adjacent digits subjected to the touch operation is determined as an insertion position. For example, when a touch operation on "35" is detected, a portion between "3" and "5" is determined as an insertion position. When a voice indicating "4" is inputted, "4" is inserted between "3" and "5," "012-356-7890" is corrected to "012-3456-7890," and the insertion operation in S116 terminates. Then, the process returns to S110.

According to the inquiry screen shown in FIG. 6 for inquiring of the user whether to perform any one of correction operation, insertion operation, and deletion operation, when a deletion operation is specified by the user, determination in S118 becomes YES, and the process performs deletion operations on a group basis (S120). In the deletion operations on a group basis, according to a touch operation on the touch switch, the process determines the group of the phone number displayed in a touch-operated position as a deletion position.

After the process prompts the user to utter a number determined as a deletion position, when the number to be deleted is inputted in a voice from the user, the number in the deletion position is deleted by the voice input.

For example, when the group "345" of "012-345-6789" is touch-operated, the "345" is determined as the group to be deleted. After the process prompts the user to utter a specific number as a deletion position, when, for example, a voice indicating "4" is inputted, the number "4" is deleted, that is, the "012-345-6789" is corrected to "012-35-6789", and the deletion operation in S120 terminates. Then, the process returns to S110.

When it is determined that input is completed (determined) according to the user's inquiry screen, determination in S110, S114, or S118 becomes NO, and the process terminates.

Though the above description has been made on the assumption that it is determined in S104 that grouping is to be made, when it is determined in S104 that grouping is not to be made, the process operates as described below.

Figure 9:
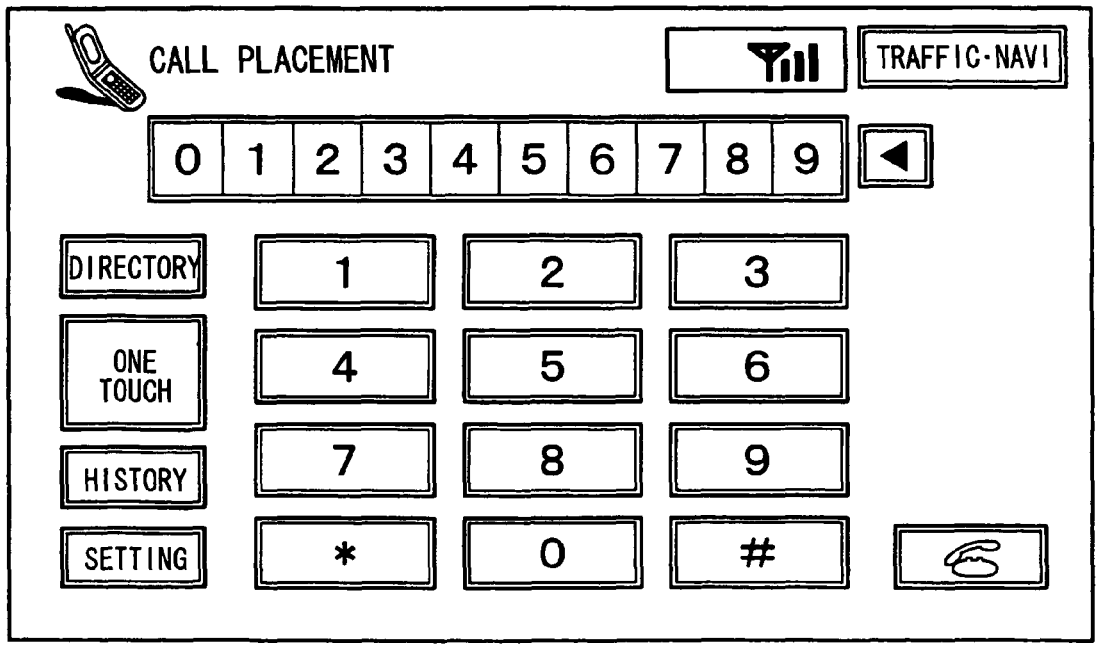
FIG. 9 shows an illustration of a telephone number input screen showing a telephone number without being grouped.

When it is determined in S104 that grouping is not made, determination of S104 becomes NO, and recognition results are displayed on a digit basis (S122). Specifically, instead of grouping a phone number, a phone number input screen represented on a digit basis is displayed in the display part of the display unit 26. FIG. 9 shows an example of "0123456789" inputted in a voice on a digit basis. A user's utterance content is displayed as "0123456789" on a digit basis without being grouped.

Next, the process outputs a talk-back voice indicating the phone number displayed on a digit basis in the display part of the display unit 26 from the loudspeaker 14 (S124). Specifically, the process outputs a voice signal for outputting a talk-back voice for a consecutive phone number without separator to the voice synthesizing unit 11 to have the voice synthesizing unit 11 output the talk-back voice from the loudspeaker 14.

In S126, the process inquires of the user whether to correct a part of the phone number displayed in the display part, and in S130, inquires of the user whether to insert a number in any position of the phone number displayed in the display part. In S134, the process inquires of the user whether to delete a part of the phone number displayed in the display part. Specifically, like the case of displaying a phone number by grouping as described above, the process displays the inquiry screen shown in FIG. 6 for inquiring of the user whether to perform any one of correction operation, insertion operation, and deletion operation in the display screen of the display unit 26, and determines whether to perform correction operation, insertion operation, and deletion operation, depending on whether any one of correction operation, insertion operation, and deletion operation is specified by user's touch switch operation of the operation switch group 23.

Figure 10A:
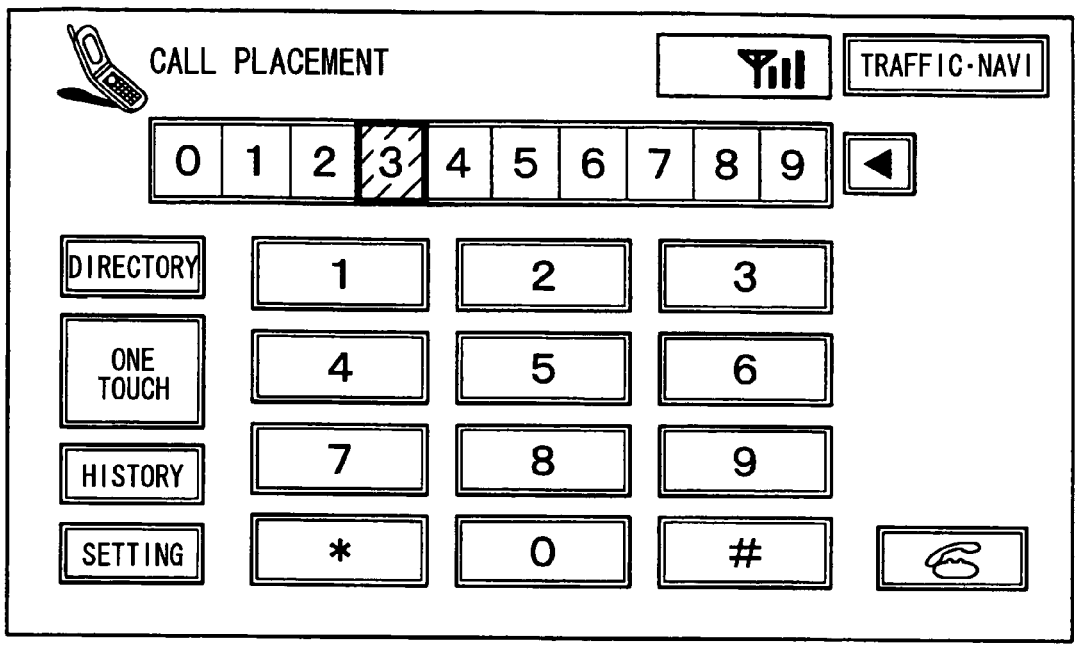
FIGS. 10A and 10B show illustrations of a telephone number input screen for a correction operation of a single character.

When correction operation is specified by user operation, determination in S126 becomes YES, and correction operation on a digit basis is performed (S128). In this operation, according to touch operation on the touch switch, one digit of the phone number displayed in a touch-operated position is determined as a correction position. For example, as shown in FIG. 10A, when "3" of "0123456789" is touch-operated, the "3" is determined as a correction position and is changed in color.

A guidance "Correct the fourth digit '3.' Enter a desired digit. Pi (A short beep)." is outputted in a voice from the loudspeaker 14.

Figure 10B:
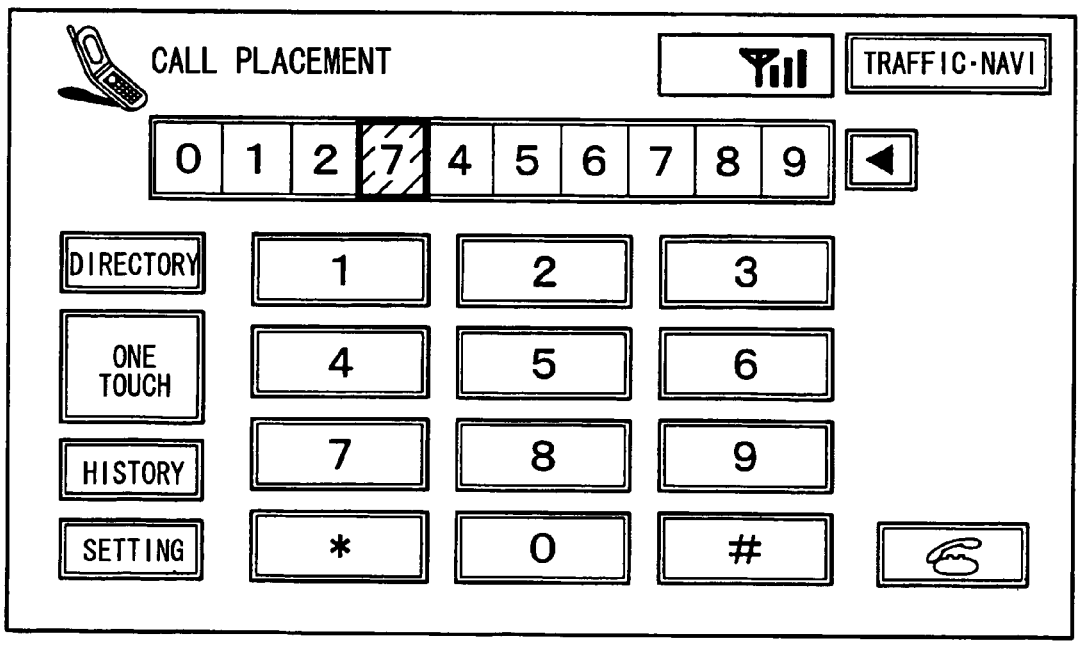

After the process thus prompts the user to utter a new number in the correction position, when a new number is inputted in a voice by the user, the original phone number is corrected to a new number in the correction position. For example, when a voice indicating "7" is inputted by the user, the original phone number is corrected to "0127456789" as shown in FIG. 10B.

Figure 11A:
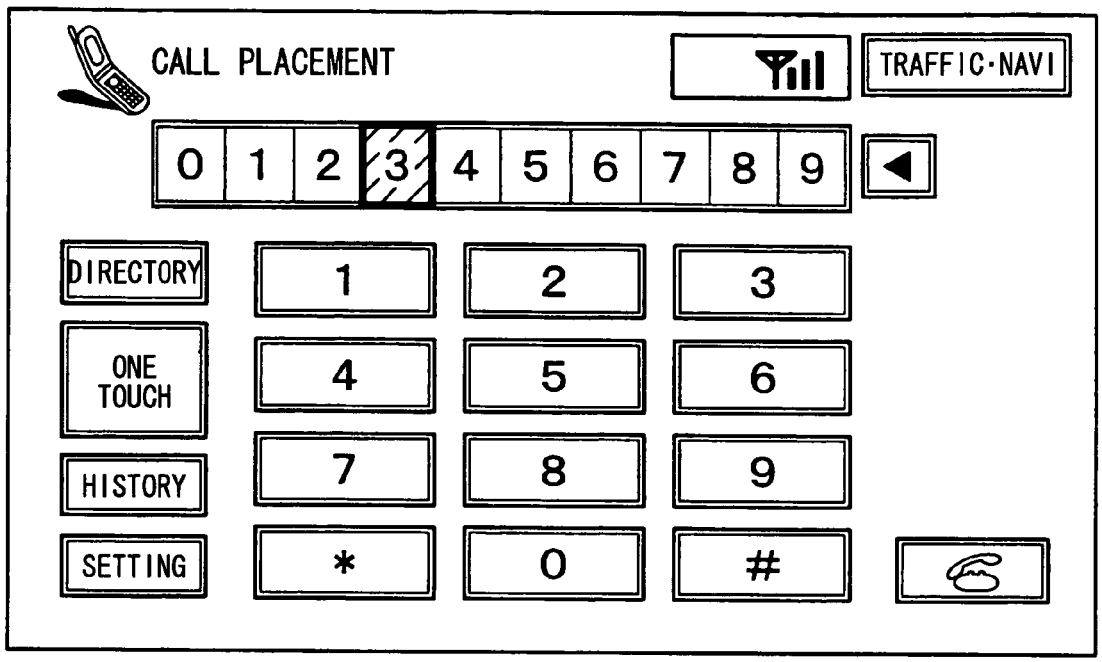
FIGS. 11A and 11B show another set of illustrations of a telephone number input screen for the correction operation of a single character.
Figure 11B:
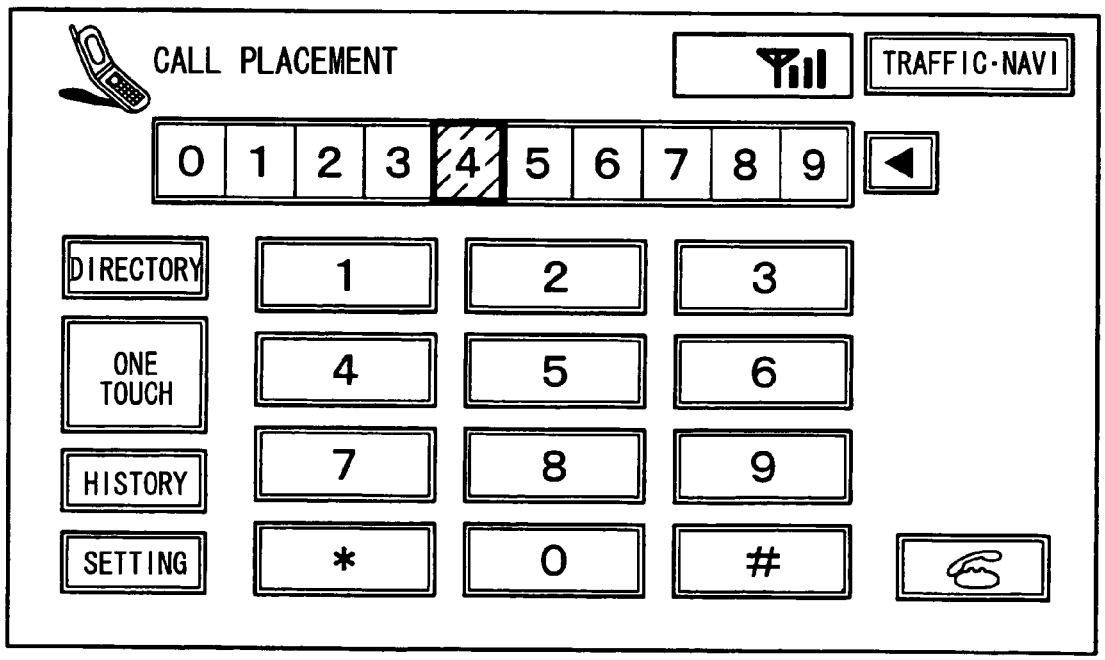

After a correction position is determined, before a guidance prompting the user to utter a desired correction number is outputted in a voice from the loudspeaker 14, when a vocabulary indicating change of the correction position such as "left," "right," "next," and "return" is recognized, the correction position is changed according to the recognized vocabulary. For example, as shown in FIG. 11A, when "right" or "next" is recognized in a state in which "3" of "0123456789" is determined as a correction position, "4" is changed to a correction position, and correction operation is performed in the changed correction position. When the correction operation in S128 thus terminates, the process returns to S126.

Figure 12A:
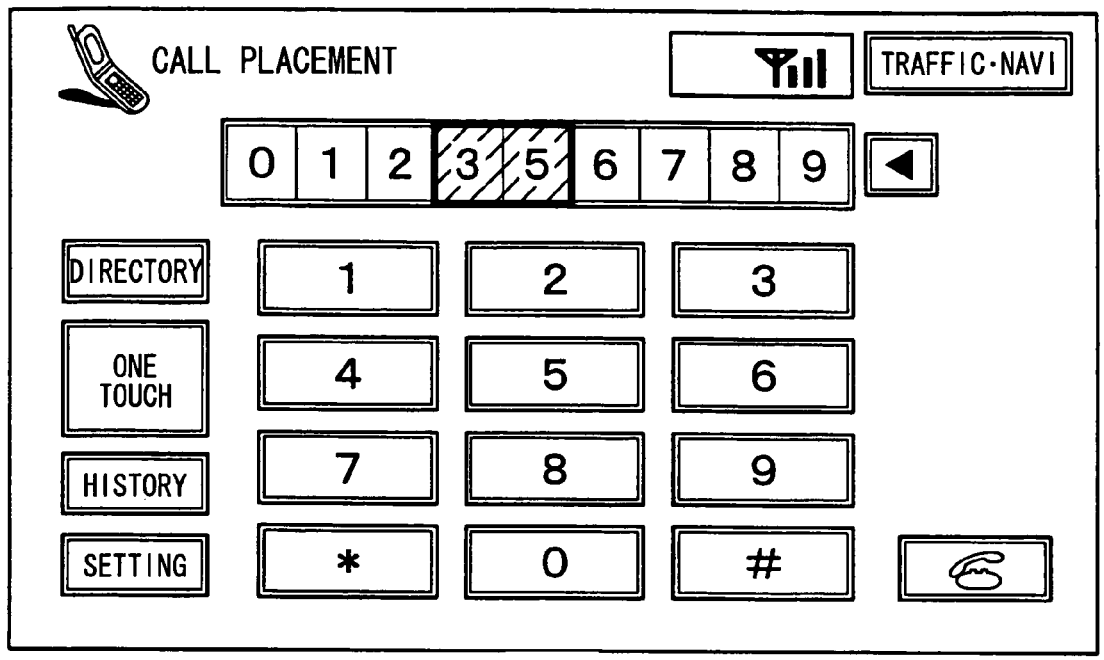
FIGS. 12A and 12B show yet another set of illustrations of a telephone number input screen for the correction operation of a single character.

According to the inquiry screen shown in FIG. 6 for inquiring of the user whether to perform any one of correction operation, insertion operation, and deletion operation, when the insertion operation is specified by user operation, determination in S130 becomes YES, and the process performs insertion operation on a digit basis (S132). In the insertion operation on a digit basis, according to a touch operation of the touch switch, a digit of the phone number displayed in a touch-operated position is determined as an insertion position. When a touch operation on two adjacent digits is detected, a portion between the touch-operated digits is determined as an insertion position. For example, as shown in FIG. 12A, when "3" and "5" of "012356789" are touch-operated, the "35" is determined as an insertion target.

Figure 12B:
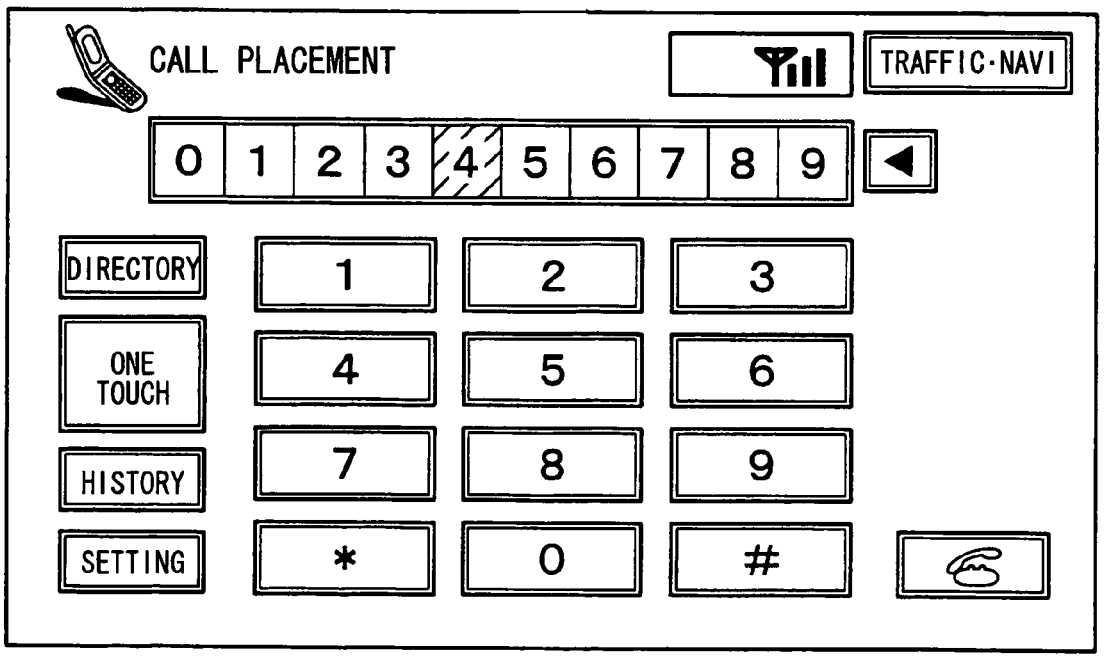

After the process prompts the user to utter a new number in the insertion position, when a number is inputted in a voice by the user, the number by the voice input is inserted in the insertion position. For example, when a voice indicating "4" is inputted by the user, "4" is inserted between "3" and "5," and as shown in FIG. 12B, the original phone number is corrected to "0123456789," and the insertion operation in S132 terminates. When the insertion operation thus terminates, the process returns to S126.

Figure 13A:
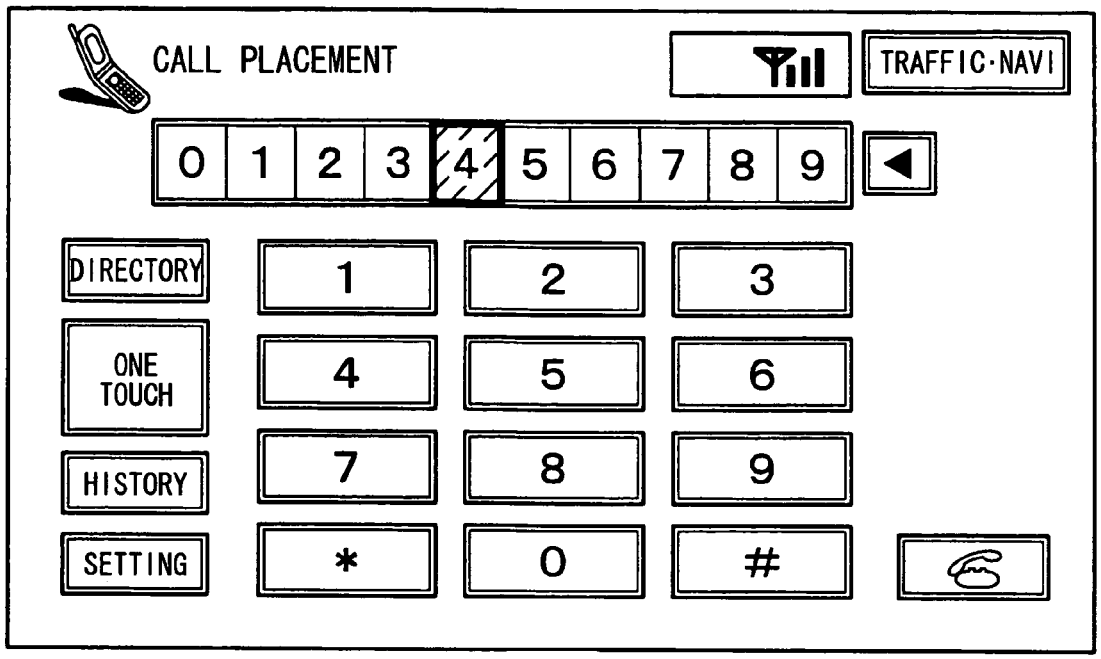
FIGS. 13A and 13B show yet another set of illustrations of a telephone number input screen for the correction operation of a single character.
Figure 13B:
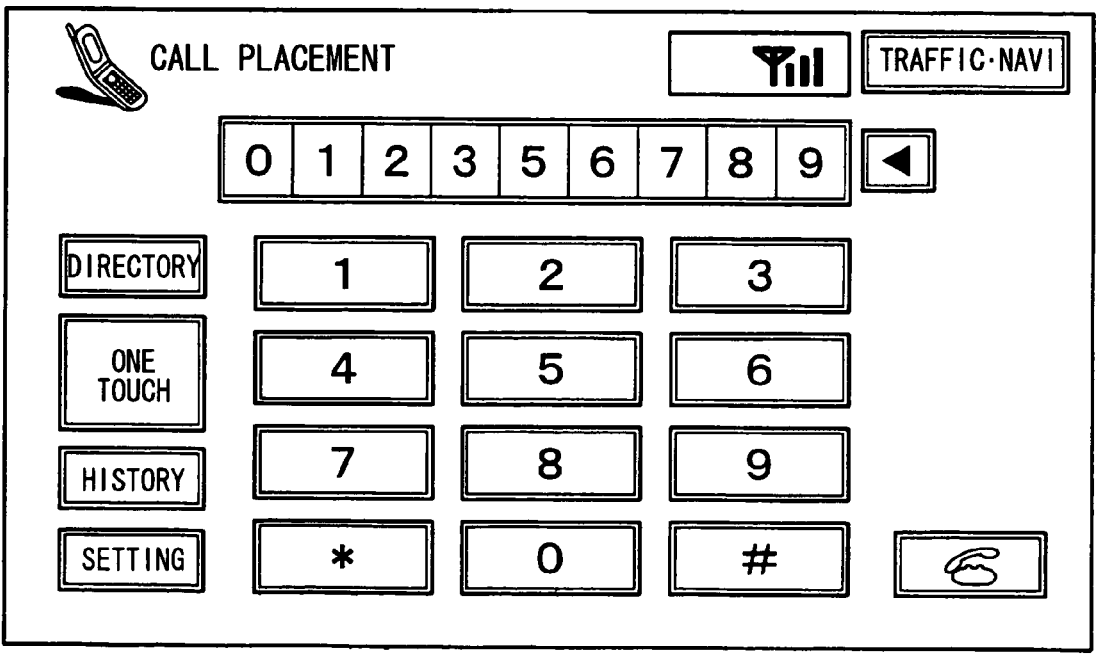

According to the inquiry screen shown in FIG. 6 for inquiring the user of whether to perform any one of correction operation, insertion operation, and deletion operation, when deletion operation is specified by user operation, determination in S134 becomes YES, and the process performs deletion operation on a digit basis (S136). In the deletion operation on a digit basis, according to a touch operation of the touch switch, a digit of the phone number displayed in a touch-operated position is determined as a deletion position. For example, as shown in FIG. 13A, when "4" of "0123456789" is touch-operated, the "4" is determined as a deletion target and deleted. As shown in FIG. 13B, "0123456789" is corrected to "012356789," and the deletion operation in S136 terminates. Then, the process returns to S126.

When input completion (determination) is confirmed according to the user's inquiry screen, determination in S126, S130, or S134 becomes NO, and the process terminates.

According to the above-described construction, when it is determined from the content of a phone number included in a recognized voice that the phone number is grouped into an area code, a city code, and a subscriber number, since the phone number is displayed after being grouped into an area code, a city code, and a subscriber number, the phone number can be displayed in groups according to user's utterance contents.

Whether to group a phone number into an area code, a city code, and a subscriber number can be determined based on whether vocabularies for separating to groups of area code, city code, and subscriber number are included in a recognized voice.

Further, whether to group a phone number into an area code, a city code, and a subscriber number can be determined based on whether digit-unit-reading vocabularies are included in a recognized voice.

Furthermore, whether to group a phone number into an area code, a city code, and a subscriber number can be determined based on whether silent states for separating the phone number into plural groups are included in the phone number included in a recognized voice.

Furthermore, whether to group a phone number into an area code, a city code, and a subscriber number can be determined based on whether long sounds for separating the phone number into plural groups are included in the phone number included in a recognized voice.

When it is determined that a phone number is not grouped into an area code, a city code, and a subscriber number, the phone number can be displayed consecutively in the display part without being separated.

The present invention is not limited to the above-described embodiment, and may be corrected in various ways based on the purport of this invention.

Figure 14:
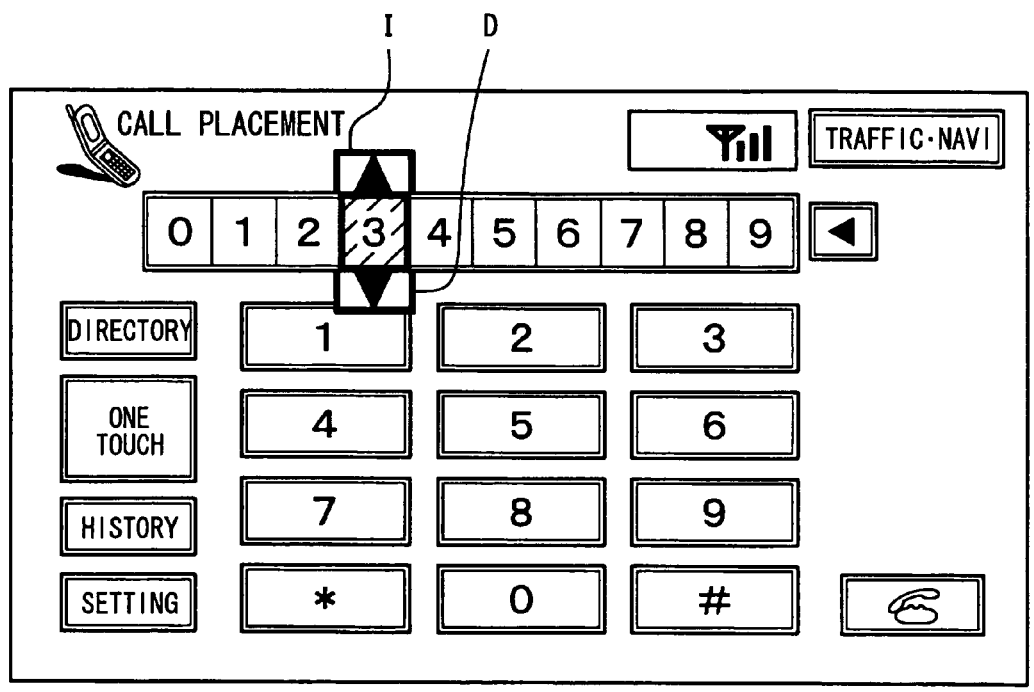
FIG. 14 shows an illustration of a modification of a telephone number input screen for the correction operation of a single character.

For example, in the above-described embodiment, in the correction on a digit basis in S128, after a correction position of a phone number is determined, a number in the correction position is corrected using a number recognized by voice recognition as a new number. For example, however, as shown in FIG. 14, an increment button I for incrementing a digit in a correction position and a decrement button D for decrementing a digit in a correction position may be displayed in the display part of the display unit 26 so that, when a touch operation by a touch switch is detected, a number in a correction position is incremented or decremented according to an operation on buttons I and D displayed in a touch operation position.

Figure 15A:
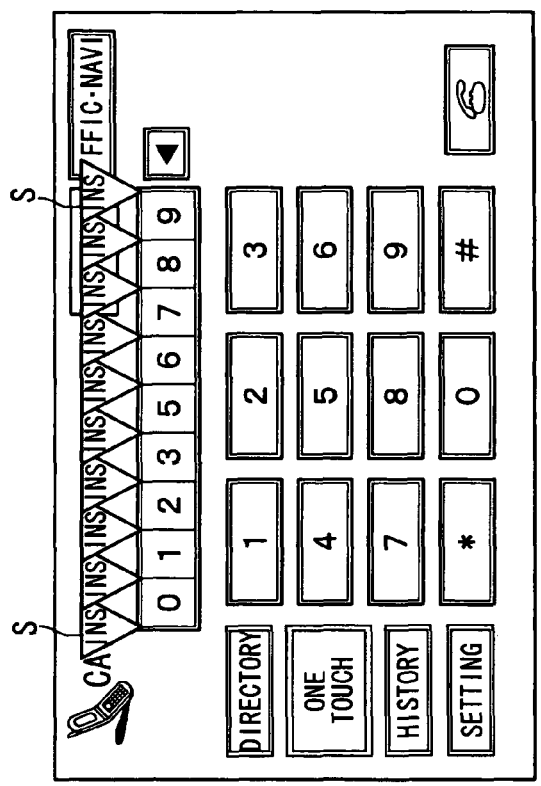
FIGS. 15A to 15C show illustrations of a modification of an insertion operation.
Figure 15B:
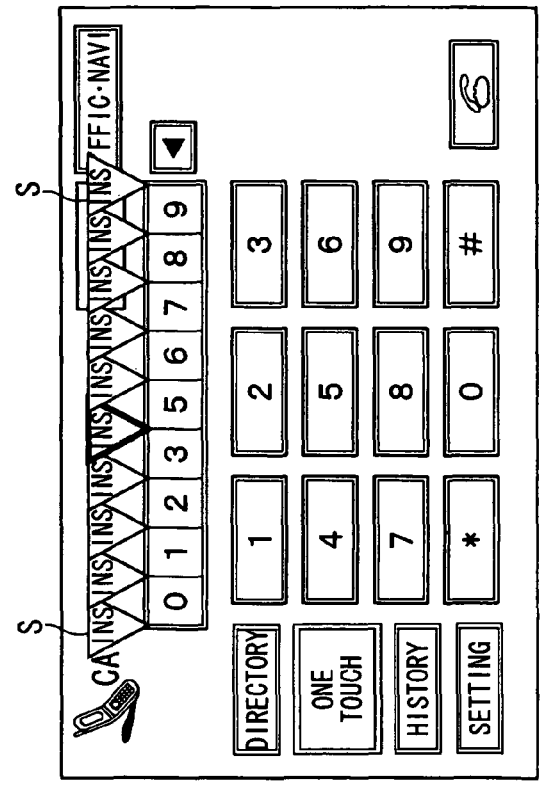
Figure 15C:
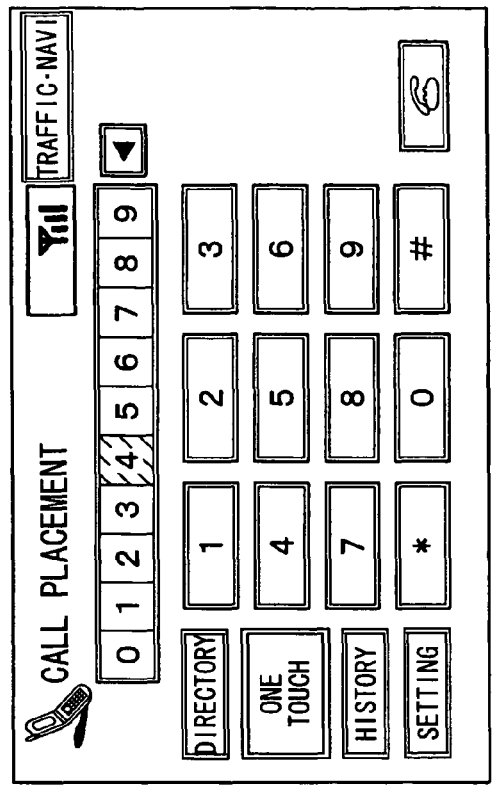

In the above-described embodiment, in the insertion operations in S116 and S132, an insertion position of a phone number is determined by a touch operation on the touch switch. However, as shown in FIG. 15A, insertion buttons S for specifying an insertion position may, for example, be displayed between digits of a phone number so that, when a touch operation by the touch switch is detected, as shown in FIG. 15B, the position of an insertion button S displayed in a position where the touch operation has been performed is determined as an insertion position. In this case, after an insertion position is determined, the process prompts the user to utter a number to be inserted, and, when the number to be inserted has been inputted in a voice, the number can be inserted in the insertion position. For example, after the process prompts the user to utter the number to be inserted, when a voice indicating "4" is inputted, "4" is inserted in the insertion position, and as shown in FIG. 15C, the phone number is corrected to "0123456789."

Figure 16:
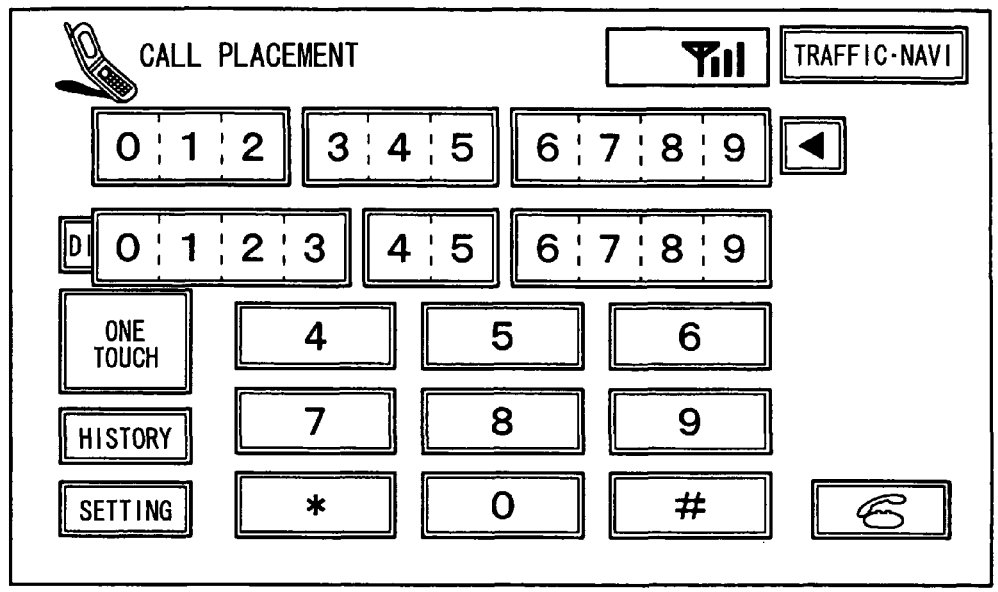
FIG. 16 shows an illustration of a modification of a telephone number input screen showing a telephone number in the grouped state.

In the above-described embodiment, whether to group a phone number into an area code, a city code, and a subscriber number is determined from the content of a phone number included in a recognized voice in S102. However, when a phone number included in a recognized voice includes, for example, three silent states or more for separating the phone number into plural groups, it may be difficult to group the phone number into an area code, a city code, and a subscriber number by one separating method. In such a case, of candidates of plural separating methods, a similarity level between a first candidate for separation by the most likely separating method and a second candidate for separation by the second most likely separating method is found, and when it is determined that the similarity level is greater than a predetermined value, both the first candidate and the second candidate may be displayed in the display part. For example, as shown in FIG. 16, "012-345-6789" is displayed as the first candidate, and "0123-45-6789" is displayed as the second candidate, prompting the user to select between them.

Figure 17:
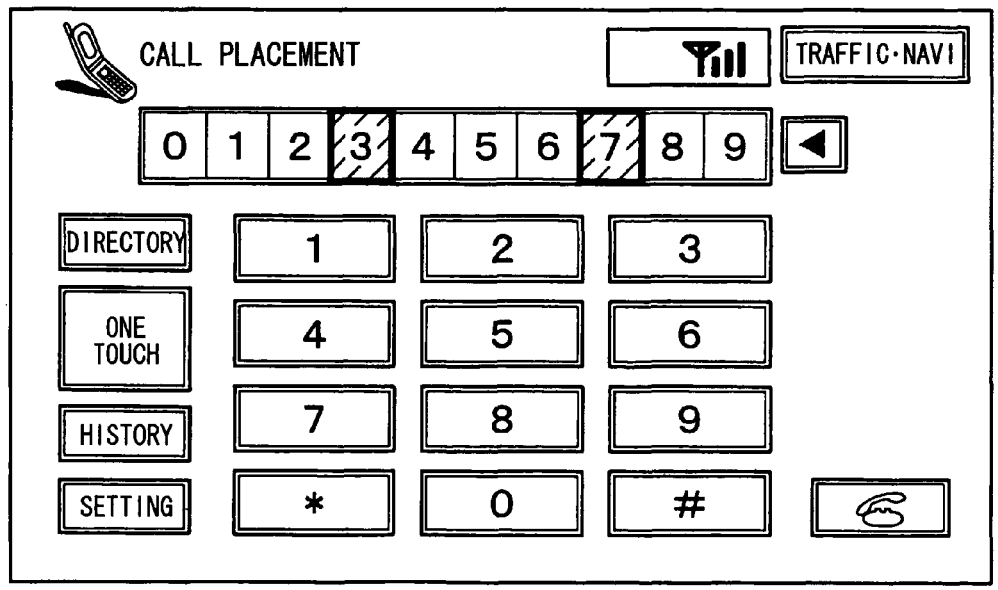
FIG. 17 shows an illustration of a modification of a telephone number input screen for the correction operation of a single character.

In the above-described embodiment, in the correction operation on a digit basis in S128, one digit of a phone number is determined as a correction position and corrected. However, plural digits may be determined as correction positions at a time. In this case, for example, as shown in FIG. 17, after "3" and "7" of "0123456789" are determined as correction positions, the process prompts the user to utter new numbers in the correction positions, and when a voice indicating "48" is inputted, "3" is corrected to "4," and "7" is corrected to "8," so that the "0123456789" is corrected to "0124456889."

In the above-described embodiment, in S114 and S130, the process inquires of the user whether to insert number in any positions of a phone number displayed in the display part, and performs insertion operation when determining the insertion operation is performed according to user's operation. However, the process determines whether a phone number recognized in a voice satisfies the number of digits of the phone number to be recognized, and when it is determined that the number of digits of the phone number to be recognized is not satisfied, insertion operation may be performed. For example, a phone number recognized in a voice has less than 10 digits, and when it is determined that it does not satisfy the number of digits of the phone number to be recognized, insertion operation may be performed.

In the above-described embodiment, as shown in conditions (1) to (4), whether to group a phone number into an area code, a city code, and a subscriber number is determined from the content of a phone number included in a recognized voice. However, whether to group a phone number into an area code, a city code, and a subscriber number may, for example, be determined using information of intonation, accent, pitch, and/or frequency characteristics of the phone number in a voice recognition result.

In the above-described embodiment, the control circuit 28 and the control unit 13 jointly recognize a phone number included in voice collected by the microphone 15 and display it in the display part of the display unit 26, and outputs a talk-back voice of the displayed phone number from the loudspeaker 14 (phone number recognition process). In addition, a destination may, for example, be set by using the phone number search by a phone number recognized by the phone number recognition process described above to set a guidance route to the destination and perform a traveling guidance according to the guidance route. Such changes and modifications are to be understood as being within the scope of the present invention as defined by the appended claims.

The voice recognition unit 10 and step S102 may conceptually be claimed as a voice recognition means, step S104 may conceptually be claimed as a grouping determination means, steps S106 and S122 may conceptually be claimed as a display control means, steps S110 and S126 may conceptually be claimed as a correction inquiry means, steps S112 and S128 may conceptually be claimed as a number correction means, steps S114 and S130 may conceptually be claimed as an insertion inquiry means, steps S116 and S132 may conceptually be claimed as a number insertion means, steps S118 and S134 may conceptually be claimed as a deletion inquiry means, steps S120 and S136 may conceptually be claimed as a number deletion means, and steps S108 and S124 may conceptually be claimed as a talkback voice output means.

What is claimed is:

1. A voice recognition apparatus comprising:
   a voice recognition means that recognizes voice collected by a microphone;
   a grouping determination means that determines whether to group a phone number included in voice recognized by the voice recognition means into an area code, a city code, and a subscriber number based on a content of the recognized voice; and
   a display control means that, when the grouping determination means determines that the phone number is to be grouped, displays in a display part the phone number after grouping into an area code, a city code, and a subscriber number,
   wherein the grouping determination means determines whether to group a phone number into an area code, a city code, and a subscriber number, based on whether long sounds for separating the phone number into plural groups are included in the phone number that is included in voice recognized by the voice recognition means, a grouping within the phone number being framed at a position of the long sounds of the recognized voice.

2. A voice recognition apparatus comprising:
   a voice recognition means that recognizes voice collected by a microphone;
   a grouping determination means that determines whether to group a phone number included in voice recognized by the voice recognition means into an area code, a city code, and a subscriber number based on a content of the recognized voice; and
   a display control means that, when the grouping determination means determines that the phone number is to be grouped, displays in a display part the phone number after grouping into an area code, a city code, and a subscriber number,
   wherein the grouping determination means determines whether to group a phone number into an area code, a city code, and a subscriber number, based on whether vocabularies for separating the phone number into groups of an area code, a city code, and a subscriber number are included in the phone number that is included in voice recognized by the voice recognition means, a grouping within the phone number being framed according to the vocabularies for separating the phone number into the area code, the city code, and the subscriber number of the recognized voice,
   wherein, when similarity between a first candidate according to a most probable separation manner and a second candidate according to a next probable separation manner is equal to or greater than a predetermined similarity in grouping the phone number, the display control means displays both of the first candidate and the second candidate in the display part.

3. A navigation apparatus for performing navigation processing comprising:
   a voice recognition means that recognizes voice collected by a microphone;
   a grouping determination means that determines whether to group a phone number included in voice recognized by the voice recognition means into an area code, a city code, and a subscriber number based on a content of the recognized voice; and
   a display control means that, when the grouping determination means determines that the phone number is to be grouped, displays in a display part the phone number after grouping into an area code, a city code, and a subscriber number,
   wherein the grouping determination means determines whether to group a phone number into an area code, a city code, and a subscriber number, based on whether vocabularies for separating the phone number into groups of an area code, a city code, and a subscriber number are uttered in the phone number that is included in voice recognized by the voice recognition means, a grouping within the phone number being framed at a position of the vocabularies for separating the phone number into the area code, the city code, and the subscriber number of the recognized voice,
   wherein the voice recognition apparatus feeds the navigation processing with a telephone number uttered by a speaker based on a recognized speech of the speaker with an intention of telling the telephone number.

* * * * *